US010698969B2

(12) United States Patent
James et al.

(10) Patent No.: US 10,698,969 B2
(45) Date of Patent: *Jun. 30, 2020

(54) REPRESENTATION/INVOCATION OF ACTIONS/FUNCTIONS IN A HYPERMEDIA-DRIVEN ENVIRONMENT

(71) Applicant: MICROSOFT TECHNOLOGY LICENSING, LLC., Redmond, WA (US)

(72) Inventors: Alex James, Sammamish, WA (US); Michael Pizzo, Bellevue, WA (US); Pablo Castro, Redmond, WA (US); Mike Flasko, Duvall, WA (US); Lance Olson, Sammamish, WA (US); Jason Clark, Woodinville, WA (US); Sid Jayadevan, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/609,865

(22) Filed: May 31, 2017

(65) Prior Publication Data
US 2017/0262549 A1    Sep. 14, 2017

Related U.S. Application Data

(63) Continuation of application No. 13/329,129, filed on Dec. 16, 2011, now Pat. No. 9,697,297.

(51) Int. Cl.
*G06F 16/955* (2019.01)
*H04L 29/06* (2006.01)
*H04L 29/08* (2006.01)

(52) U.S. Cl.
CPC .......... *G06F 16/9566* (2019.01); *H04L 29/06* (2013.01); *H04L 29/08072* (2013.01); *H04L 69/329* (2013.01)

(58) Field of Classification Search
CPC ...... H04W 28/18; H04L 67/14; H04L 67/141; H04L 65/1069; H04L 47/365; H04L 47/36; H04L 1/0007
(Continued)

(56) References Cited

U.S. PATENT DOCUMENTS 6,038,603 A * 3/2000 Joseph ............... H04L 29/06
370/465
6,901,431 B1 * 5/2005 Dodrill ............... H04L 69/329
709/207

(Continued)

OTHER PUBLICATIONS

"Atom Publishing Protocol: Data Services URI and Payload Extensions", Retrieved From: <<https://web-beta.archive.org/web/20111121154509/http://www.odata.org:80/media/6655/[mc-apdsu][1].htm>>, Retrieved Date: Nov. 18, 2011, 160 Pages.

(Continued)

*Primary Examiner* — Mahran Y Abu Roumi

(57) ABSTRACT

The subject disclosure relates to techniques for performing an operation on a resource, based on a state of the resource, by invoking a hypertext transfer protocol (HTTP) request on a universal resource locator (URL) indicating the operation. An interface component can receive a request including an HTTP method and a URL including a first portion indicating a resource and a second portion indicating an operation. Further, an invocation component, in response to the operation being associated with the resource, can invoke the operation on the resource utilizing the HTTP method based on a state of the resource. Other embodiments relate to conditionally returning the operation within a return payload, for example, alone or within a feed, based on an (Continued)

applicability of the operation according to a state of an associated resource.

14 Claims, 12 Drawing Sheets

(58) Field of Classification Search
USPC .......................................................... 709/228
See application file for complete search history.

(56) References Cited

U.S. PATENT DOCUMENTS

| | | | |
|---|---|---|---|
| 7,587,447 B2 | 9/2009 | Ryman | |
| 8,234,662 B2* | 7/2012 | Farrell | H04L 67/02 707/705 |
| 2005/0138137 A1* | 6/2005 | Encarnacion | H04L 29/12009 709/217 |
| 2006/0104295 A1 | 5/2006 | Worley et al. | |
| 2009/0164621 A1* | 6/2009 | Kothari | H04L 43/00 709/224 |
| 2009/0172197 A1* | 7/2009 | Kalaboukis | G06F 16/955 709/246 |
| 2011/0106770 A1* | 5/2011 | McDonald | G06F 16/1873 707/661 |
| 2011/0225170 A1* | 9/2011 | Obasanjo | G06Q 10/10 707/748 |
| 2011/0252118 A1* | 10/2011 | Pantos | H04L 65/4069 709/219 |
| 2012/0036178 A1* | 2/2012 | Gavini | H04L 67/02 709/203 |
| 2012/0216131 A1* | 8/2012 | Moyers | H04L 65/1069 715/757 |
| 2012/0303774 A1* | 11/2012 | Wilson | H04L 67/26 709/223 |
| 2012/0331372 A1* | 12/2012 | Scoda | H04L 67/02 715/206 |
| 2013/0055028 A1* | 2/2013 | Patil | G06F 11/3672 714/38.1 |
| 2013/0066957 A1* | 3/2013 | Garcia-Martin | H04L 67/26 709/203 |

OTHER PUBLICATIONS

"Using Oracle WebCenter REST APIs", Retrieved From: <<http://docs.oracle.com/cd/E21764_01/webcenter.1111/e10148/jpsdg_rest_api.htm>>, Retrieved Date: Nov. 18, 2011, 28 Pages.
"Final Office Action Issued in U.S. Appl. No. 13/329,129", dated Nov. 20, 2013. 41 Pages.
"Final Office Action Issued in U.S. Appl. No. 13/329,129", dated Oct. 3, 2014, 28 Pages.
"Final Office Action Issued in U.S. Appl. No. 13/329,129", dated Oct. 22, 2015, 29 Pages.
"Non-Final Office Action Issued in U.S. Appl. No. 13/329,129", dated Nov. 3, 2016, 6 Pages.
"Non-Final Office Action Issued in U.S. Appl. No. 13/329,129", dated Apr. 6, 2015, 21 Pages.
"Non-Final Office Action Issued in U.S. Appl. No. 13/329,129", dated Jun. 6, 2014, 25 Pages.
"Non-Final Office Action Issued in U.S. Appl. No. 13/329,129", dated Jun. 5, 2013, 32 Pages.
"Notice of Allowance Issued in U.S. Appl. No. 13/329,129", dated Feb. 28, 2017, 11 Pages.
Foster, et al., "Modeling Stateful Resources with Web Services", Retrieved from: <<http://www.ibm.com/developerworks/library/ws-resource/ws-modelingresources.pdf>>, Mar. 4, 2004, 24 Pages.

* cited by examiner

REPRESENTATION/INVOCATION OF ACTIONS/FUNCTIONS IN A HYPERMEDIA-DRIVEN ENVIRONMENT

CROSS-REFERENCE TO RELATED APPLICATIONS

This is a continuation of application Ser. No. 13/329,129 filed on Dec. 16, 2011, entitled "REPRESENTATION/INVOCATION OF ACTIONS/FUNCTIONS IN A HYPERMEDIA-DRIVEN ENVIRONMENT", the entirety of which is incorporated by reference.

The subject disclosure generally relates to representation/invocation of an action/function in a hypermedia-driven environment.

BACKGROUND

Representational state transfer (REST)-based data services can enable a client to perform a set of well-defined operations associated with a resource, e.g., publish a data entity, edit the data entity, etc. via a distributed hypermedia system, e.g., the World Wide Web (WWW). As such, the client can send multiple requests to a server, via hypertext transfer protocol (HTTP) messages, to enable the server to perform an operation.

RESTful web applications, for example, use "built-in" HTTP verbs for performing create, read, update, and delete (CRUD) operations, e.g., POST, GET, PUT/PATCH, DELETE, etc. on resource(s). However, other types of custom operations, e.g., appropriate for a particular data service, are not effectively represented and/or invoked via conventional REST-based data services. Instead, such custom operations are performed by a data service in response to the client posting a resource representation, which is associated with properties representing parameter(s) of the custom operation, to a resource for invoking the custom operation. Thus, such intermingling of data and operational representations is difficult to describe and invoke in a common way via a REST-based data service.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with effectively representing and/or invoking custom operation(s) associated with a data service.

For instance, an embodiment includes receiving, by a service application associated with computing device(s), a request including an HTTP method and a network resource locator identifying an operation, e.g., a function, an action, etc. that is associated with an instance of a resource. In an aspect, the resource is associated with a collection of typed entries representing respective structured records associated with respective keys. In another aspect, the network resource locator includes a name of the collection and an index, or a key, for indentifying the instance of the resource. In yet another aspect, a first portion of the network resource locator identifies the instance of the resource and a second portion of the network resource locator identifies the operation. Further, the embodiment includes associating the first portion that identifies the instance of the resource with the second portion that identifies the operation. Then, in response to the associating the first portion with the second portion, invoking the operation on the instance utilizing the HTTP method based on a state of the instance.

In another embodiment, the network resource locator, and associated metadata, is conditionally returned, published, etc. for entries within, or without, a feed, e.g., as an opaque link within a return payload of one or more requested resource(s), for example, as a link within an Atom Publishing Protocol (ATOM) entry or metadata associated with a JavaScript Object Notation (JSON) object, based on a current state of the resource, e.g., in response to a call of the operation on the instance being valid based on the current state of the instance.

In an embodiment, metadata is conditionally returned, published, etc. for the entries including an operation identifier, a network resource locator describing the metadata including any parameters for the operation and/or a return type for the operation, and/or a friendly name.

In yet another embodiment, parameter(s) can be appended to the opaque link, for example, as query string options, e.g., not requiring a parsing of the opaque link.

In one embodiment, the invoking the operation includes invoking, executing, etc. an action on the instance of the resource utilizing the HTTP method, e.g., POST, etc. having a side effect on the instance, one or more related or unrelated instances, or a state of an associated system, e.g., modifying the instance, changing the instance, deleting the instance, etc. In yet another embodiment, the invoking the operation includes invoking, executing, etc. a function on the instance of the resource utilizing the HTTP method, e.g., GET, etc. not having a side effect on the instance, e.g., obtaining a state of the instance, reading the instance, copying the instance to a local data store, etc.

Another embodiment can include defining the operation using one or more entity data model types, e.g., utilizing a FunctionImport element in conceptual schema definition language (CSDL).

In one embodiment, the receiving the request includes receiving the network resource locator including a function string indicating a function, and/or an action string indicating an action. Further, the invoking the operation includes invoking the function on the instance and/or invoking the action on the instance.

In an embodiment, the receiving the network resource locator includes receiving: (1) a resource string indicating the instance, e.g., the first portion of the network resource locator; (2) the resource string being included in the function string; (3) the resource string being included in the action string; (4) the action string being appended to the function string; and/or (5) the function string being appended to another function string.

In another embodiment, the receiving the network resource locator includes receiving a key indicating a parameter that is associated with the function and/or the action. In yet another embodiment, the receiving the network resource locator includes receiving a parameter string being appended to the action string and including a parameter that is associated with the function and/or the action.

In one embodiment, the receiving the parameter string includes receiving the function string within the parameter string. In another embodiment, the receiving the network resource locator includes receiving the function string being appended to another function string and receiving the action string being appended to the function string.

In yet another embodiment, the receiving the network resource locator includes receiving a parameter string including a placeholder associated with a parameter of the function and/or the action. In an embodiment, the receiving the network resource locator includes receiving a parameter string in a uniform resource locator path, a query string, a header, a body of the request, the function string, and/or the action string.

Another embodiment can include caching metadata that is associated with the first portion, the second portion, and/or the instance for re-use. As such, the server can more efficiently decode the network resource locator, and/or invoke, execute, etc. the respective action/function by correlating, referencing, etc. segment(s), string(s), etc. of the network resource locator to parameter(s), action(s), function(s), other segment(s), other string(s), etc. previously stored in the cache. Yet another embodiment can include publishing, e.g., displaying, etc. information that is associated with the operation in response to receiving a query, e.g., requesting knowledge of available actions, functions, associated parameters, etc. related to a data service, the resource, etc.

In one non-limiting implementation, an interface component can receive a request including a hypertext transfer protocol (HTTP) method and a universal resource locator (URL) including a first portion indicating a resource and a second portion indicating an operation. Further, an invocation component, in response to the operation being associated with the resource, can invoke the operation on the resource utilizing the HTTP method based on a state of the resource.

In one embodiment, a storage component can store metadata that is associated with the operation and/or the resource in a cache to obtain cached data. Further, the invocation component can invoke the operation based on the cached data.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
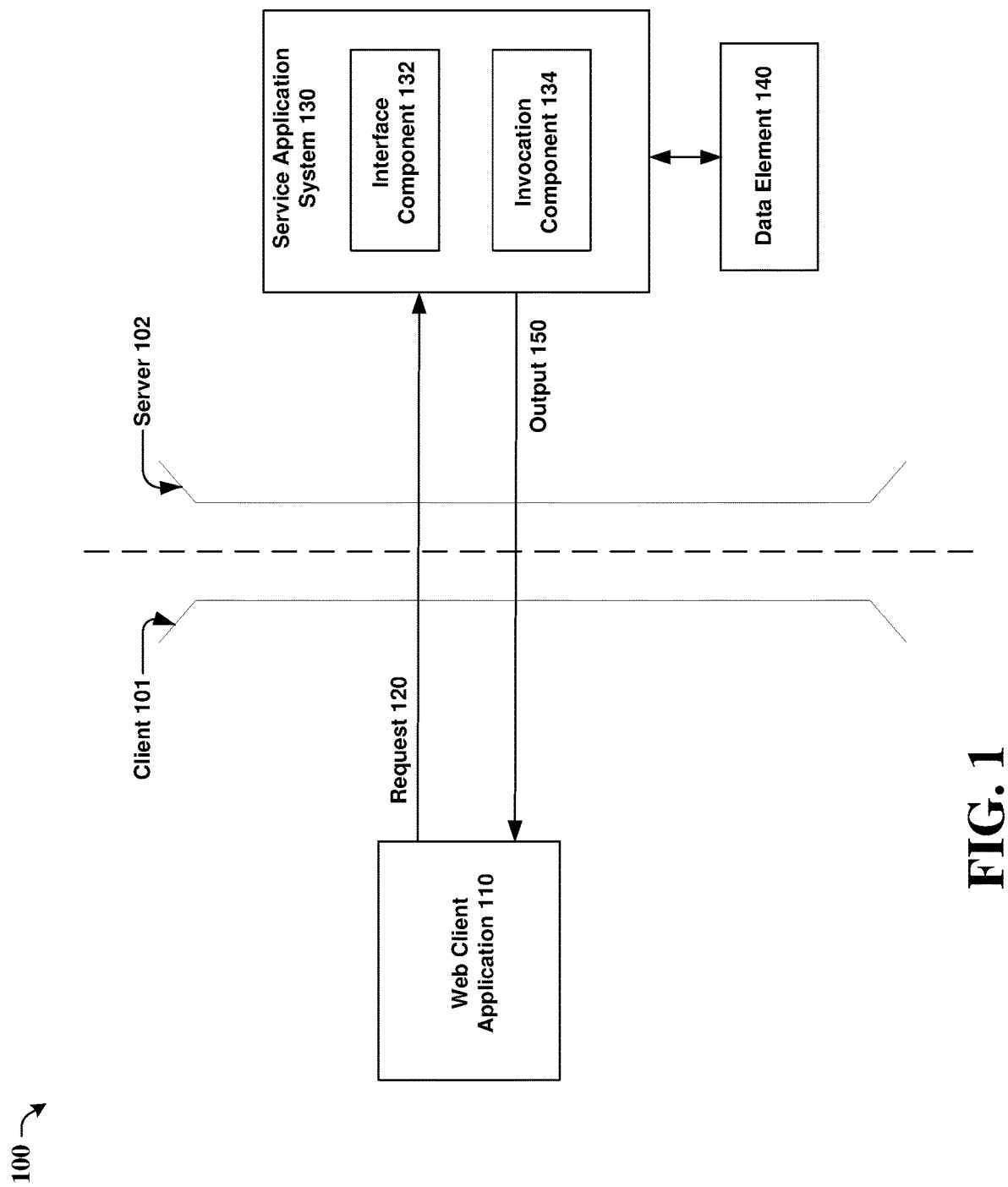
FIG. 1 illustrates an exemplary data services environment including a service application for performing an operation on a data entity according to an embodiment.

As indicated in the background, custom operations, i.e., appropriate for a particular data service, are not effectively represented via conventional REST-based data services.

In consideration of these and other deficiencies of the conventional technologies, the subject matter disclosed herein relates to providing a mechanism for effectively invoking a custom operation, e.g., an action, a function, etc. on a resource that is associated with a data service. An action, for example, is an operation that can have a side effect, or modify, create, change, etc. the resource, related resource(s), a state of the data service, etc. For example, a request to check out a movie associated with a REST-based data service involves modifying, changing, etc. an instance of the resource, e.g., for indicating the movie is checked out. On the other hand, a function is an operation that does not have a side effect on the system. As such, for example, a function that identifies a most recently checked out movie does not modify, e.g., create, change, etc. an instance associated with the resource.

In various embodiments, the action and/or the function can be flexibly specified via the network resource locator and invoked via an HTTP method applied to the network resource locator.

In one embodiment, a method comprises receiving, by a service application of at least one computing device, a request including an HTTP method and a network resource locator indentifying an operation that is associated with an instance of a resource; associating a first portion of the network resource locator indicating the instance of the resource with a second portion of the network resource locator indicating the operation; and in response to the associating the first portion with the second portion, invoking the operation on the instance utilizing the HTTP method based on a state of the instance.

In another embodiment, a system comprises an interface component stored in a computer readable storage medium configured to receive a request including an HTTP method and a URL including a first portion indicating a resource and a second portion indicating an operation; and an invocation component configured to, in response to the operation being associated with the resource, invoke the operation on the resource utilizing the HTTP method based on a state of the resource.

In another embodiment, a computer-readable storage medium is provided comprising computer executable instructions that, in response to execution, cause a computing device to perform operations. The operations include receiving, from a web client, e.g., which is associated with the WWW, a request including an HTTP method and a network resource locator including at least one of a function string that is associated with an instance of a resource or an action string that is associated with the instance. Then, in response to associating the at least one of the function string or the action string with a respective operation, invoking the respective operation on the instance using the HTTP method based on a state of the resource.

Such techniques enable effectively invoking custom operation(s) associated with a data service.

Representing/Invoking Actions/Functions in a Hypermedia-Driven Environment

Referring now to FIG. 1, data services environment 100 is depicted including service application system 130, e.g., associated with server 102, which can perform an operation, e.g., a function, an action, etc. on a resource, e.g., a data entity, data element 140, an instance of the resource, etc. via an HTTP method executed on a network resource locator, e.g., a URL. Generally, service application system 130 can include interface component 132 and invocation component 134 that, as with all components described herein, can be stored in a computer readable storage medium.

Figure 2:
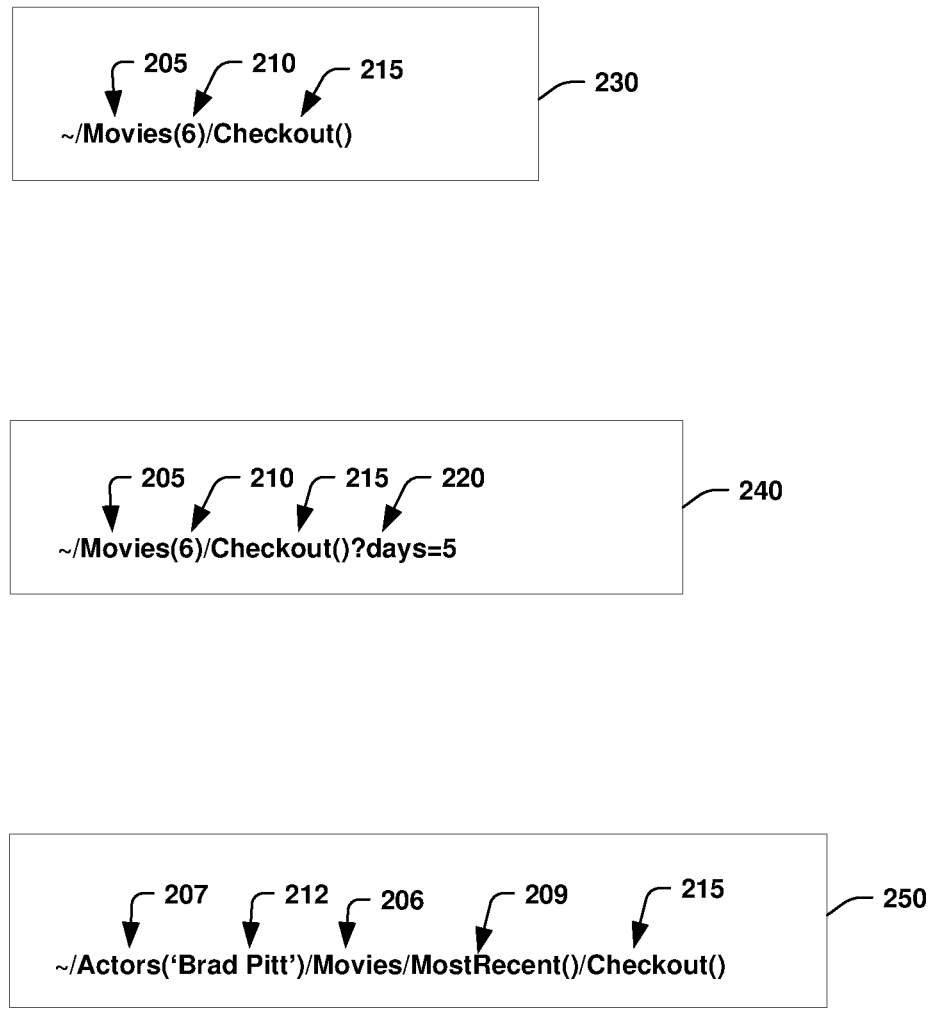
FIGS. 2-3 illustrate exemplary URLs according to various embodiments.
Figure 3:
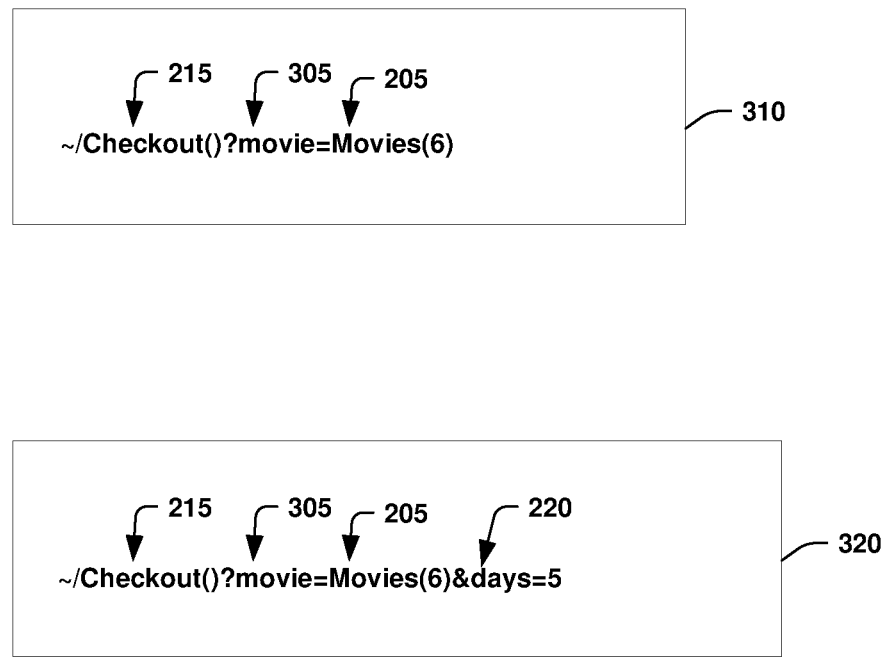

Interface component 132 can be configured to receive request 120 from web client application 110, e.g., associated with client 101. Request 120 can include an HTTP method and a URL, e.g., URL 230, URL 240, and URL 250 (as illustrated by FIG. 2); URL 310 and URL 320 (as illustrated by FIG. 3), etc.

For example, referring to the example above and FIG. 2, request 120 can include a first portion indicating an instance of a resource, e.g., URL segment 205 of URL 230 and URL 240, for identifying an instance within a movie collection by an index, or key 210; and/or URL segment 207 of URL 250 for identifying an instance, or actor, within a collection of actors based on key 212. In one embodiment, e.g., with URL 240, URL segment 205 can reference a movie collection qualified with key 210. In another embodiment, e.g., with URL 250, URL segment 207 can reference an actor's collection qualified with key 212.

In another embodiment, request 120 can include a second portion indicating the operation, e.g., an action segment, a function segment, etc. For example, request 120 can include URL segment 209 for performing a function that identifies a most recent movie associated with respective outputs of URL segment 207 and URL segment 205; URL segment 215, e.g., via URL 230, via URL 240, etc. for performing an action that checks out a movie associated with URL segment 205, etc. In yet another embodiment, request 120 can include URL segment 215, e.g., via URL 250, etc. for checking out a movie associated with outputs of URL segments URL segment 207, URL segment 206, and URL segment 209.

In an embodiment, URL 230 and URL 240 include the action segment, or URL segment 215, being appended to a segment that identifies a resource via a built-in collection index by key semantics, e.g., URL segment 205. Further, URL 250 includes the action segment, e.g., URL segment 215, being appended to one or more function segments, e.g., URL segment 209. URL 240, URL 310, and URL 320 include one or more parameter specifications, options, query options, segments, e.g., query string field-value pair 220, query string field-value pair 305, etc. being appended to the action segment, e.g., URL segment 215. The one or more parameter specifications can include, specify, etc. a respective parameter, e.g., a movie for checkout, a number of days the movie will be checked out, etc. As illustrated by FIG. 3, the one or more parameter specifications, e.g., query string field-value pair 305, can include the segment that identifies the resource, e.g., URL segment 205. As such, action(s), function(s), and/or parameter(s) associated with data element 140, e.g., associated with a movie, the resource, the instance of the resource, etc. can be flexibly specified via request 120.

Referring again to FIG. 1, the URL can include a key, a parameter, a function segment, etc. indicating, e.g., the resource, the resource instance, data element 140, etc. Then, in response to the operation being associated with the resource, invocation component 134 can invoke, execute, perform, etc. the operation on the resource utilizing the HTTP method based on a state of the resource. For example, and now referring to FIGS. 4-6, invocation component 134 can invoke an action having a side effect on, e.g., the resource, an other resource, related resource(s), a state of the data service, etc. via an HTTP POST request based on a state of the resource, the resource instance, etc. In another example, invocation component 134 can invoke a function not having a side effect on the resource via an HTTP GET request based on the state of the resource.

Figure 4:
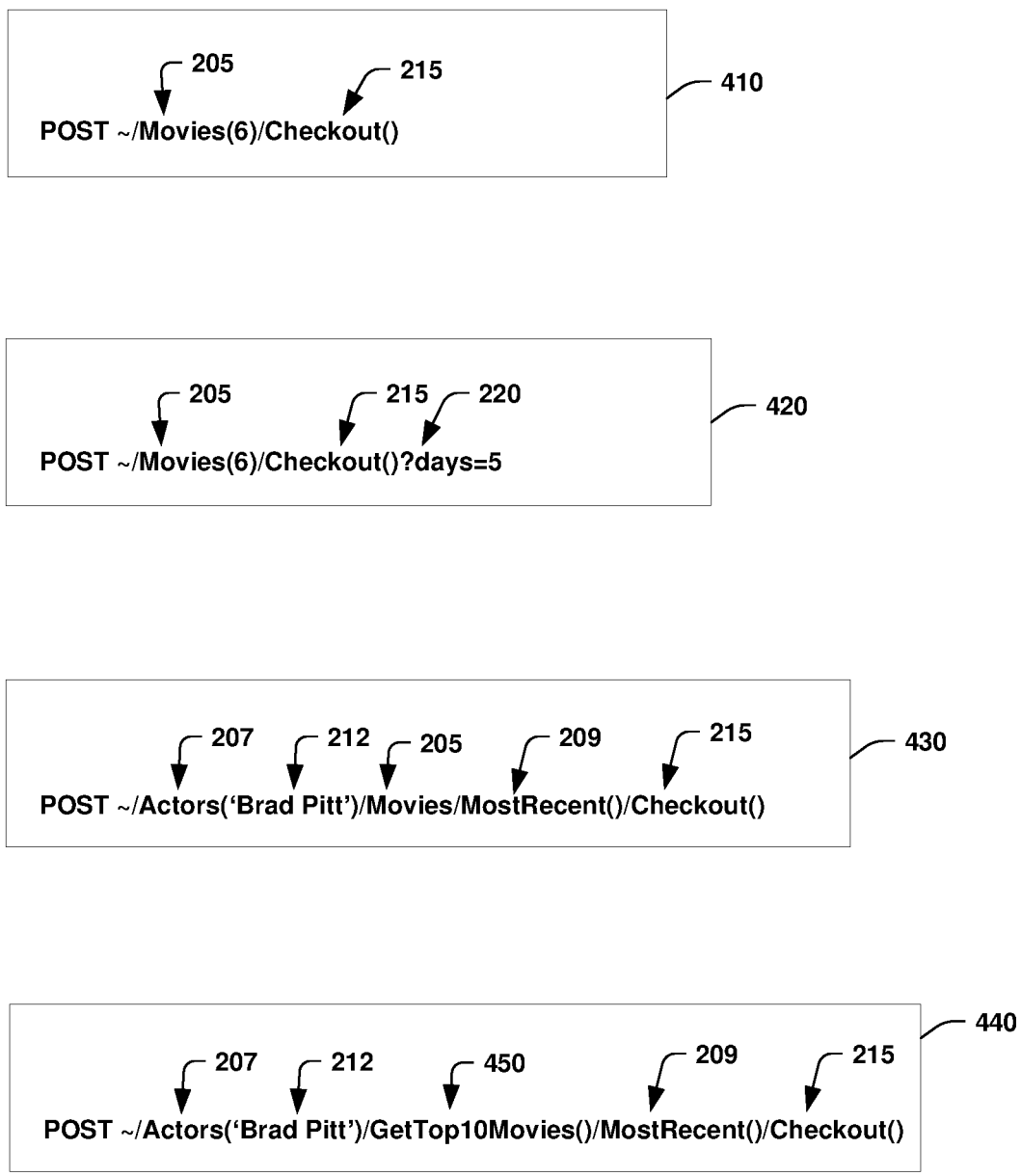
FIGS. 4-6 illustrate exemplary requests according to various embodiments.

For example, in embodiments illustrated by FIG. 4, request 410 can include an HTTP POST request and an action segment, e.g., URL segment 215, being appended to a function segment, e.g., URL segment 205, a resource segment, a navigation property, etc. for identifying the resource, e.g., for checking out a movie that is associated with a key, or identification (ID) 6, based on a state of the movie, e.g., based on the movie not being checked out. In another embodiment, request 420 can include an HTTP POST request and an action segment, e.g., URL segment 215, including a parameter specification, e.g., query string field-value pair 220. As such, URL segment 215 is appended to the function segment identifying the resource, e.g., URL segment 205, e.g., for checking out the movie that is associated with the key for a period of 5 days, e.g., based on the state of the movie indicating it is not checked out.

In yet another embodiment, request 430 can include an HTTP POST request and an action segment, e.g., URL segment 215, being appended to a function segment, e.g., a URL segment 209 being appended to resource segment(s) and/or one or more navigation properties, e.g., URL segment 205 and URL segment 207. As such, an output of a function that is associated with one or more resource segments and/or navigation properties can bind to the target of an action that is associated with the action segment.

In one embodiment, request 440 can include an HTTP POST request and a function segment, e.g., URL segment 209, that is bound to a result of another function segment, e.g., URL segment 450 for identifying the top ten movies associated with an output of URL segment 207.

In another embodiment, an output of a function can bind to an input of an action associated with the action segment for performing the operation on, e.g., the resource, the instance of the resource, data element 140, etc. Thus, for example, request 440 can invoke the HTTP POST request to check out a most recent of the top 10 movies in which Brad Pitt performed, e.g., in response to a state of the movie indicating the movie is not checked out.

In yet another embodiment (not shown), the operation, e.g., function, action, etc. can be advertised, published, etc. as an opaque link within a return payload of one or more requested resource(s), for example, as a link within an ATOM entry or metadata associated with a JSON object. In one aspect, the link is returned within the return payload, or present/absent from entries included in the return payload, based on a current state of the instance, e.g., in response to an execution of the operation on the instance being valid based on the current state of the instance.

Figure 5:
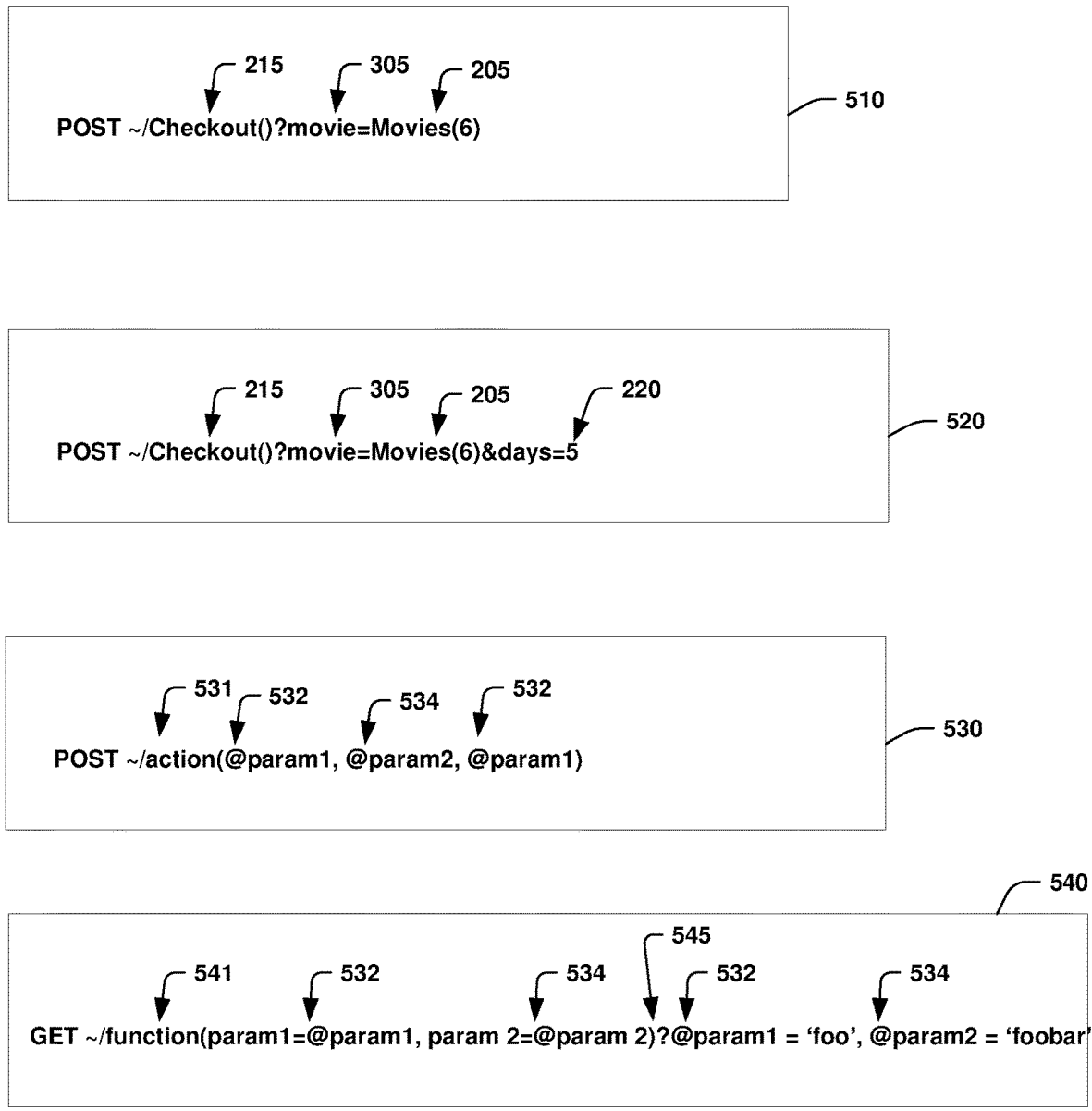

FIG. 5 illustrates, according to various embodiments, requests 510 and 520 including respective HTTP POST requests that include one or more parameter specifications, options, query options, segments (e.g., query string field-value pair 305, query string field-value pair 220) being appended to the action segment, e.g., URL segment 215. In one or more aspects (not shown), a request can include respective HTTP POST requests including one or more parameter specifications, options, query options, segments, etc. being appended to a function segment, e.g., URL segment 209, URL segment 450, etc. Further, the one or more parameter specifications can include a parameter segment, specification, option, query option, e.g., URL segment 205. As such, respective parameters of the one or more parameter specifications can bind to the action segment, or a function segment, for performing the operation on, e.g., the resource, the instance of the resource, data element 140, etc. via the HTTP method. In one embodiment, the instance of the resource on which the action/function can be invoked can be bound to the action/function either by appending an associated action/function string to a resource string indicating the instance, or by "passing" the instance to the action/function as a parameter of the action/function.

In other embodiments, action requests and/or function requests, e.g., requests 530 and 540, can include parameter references, parameter markers, "place holders", etc. that can be utilized within such requests without specifying associated parameter values. For example, request 530 includes first parameter reference 532 utilized two times, and second parameter reference 534 used once, for respective arguments, parameters, input, etc. of action segment 531. In another example, parameter value(s) can be specified in a URL, as shown, for example, in request 540, or may be provided elsewhere in a request, e.g., in the body of the request, through request headers, etc. For example, request 540 includes a first instance of first parameter reference 532 and a first instance of second parameter reference 534 specifying parameter usage within request 540, and a second instance of first parameter reference 532 and a second instance of second parameter reference 534 included in query string 545 specifying values to substitute into respective first instances of parameter references 532 and 534, e.g., in response to request 540 being processed.

Figure 6:
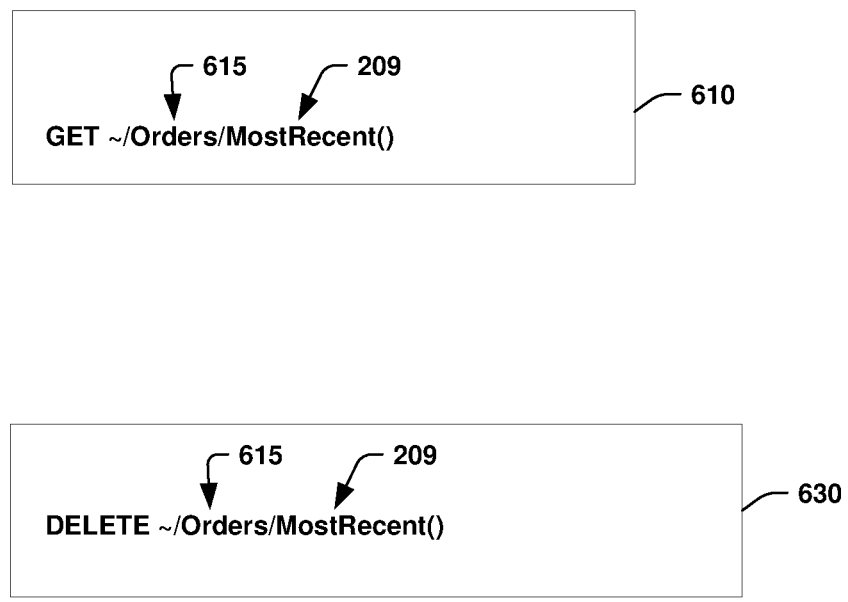

FIG. 6 illustrates, according to other embodiments, request 610 including an HTTP GET request that includes a function segment, e.g., function segment 209, being appended to a segment indicating an instance of a resource and/or a collection of resources, e.g., URL segment 615 for identifying a collection of orders. As such, an output of the segment indicates the instance and/or the collection of resources, e.g., the collection of orders. Such output binds to an input of the function segment, for example, which returns a most recent order of the order(s) via output 150. In another embodiment, request 630 includes an HTTP DELETE request method invoked on the function segment, e.g., 209, being appended to a segment indicating the collection of resources, e.g., 615. As such, the most recent order of the orders is deleted, removed, etc. from data entries associated with the resource, the instance of the resource, the collection of resources, data element 140, etc.

Figure 7:
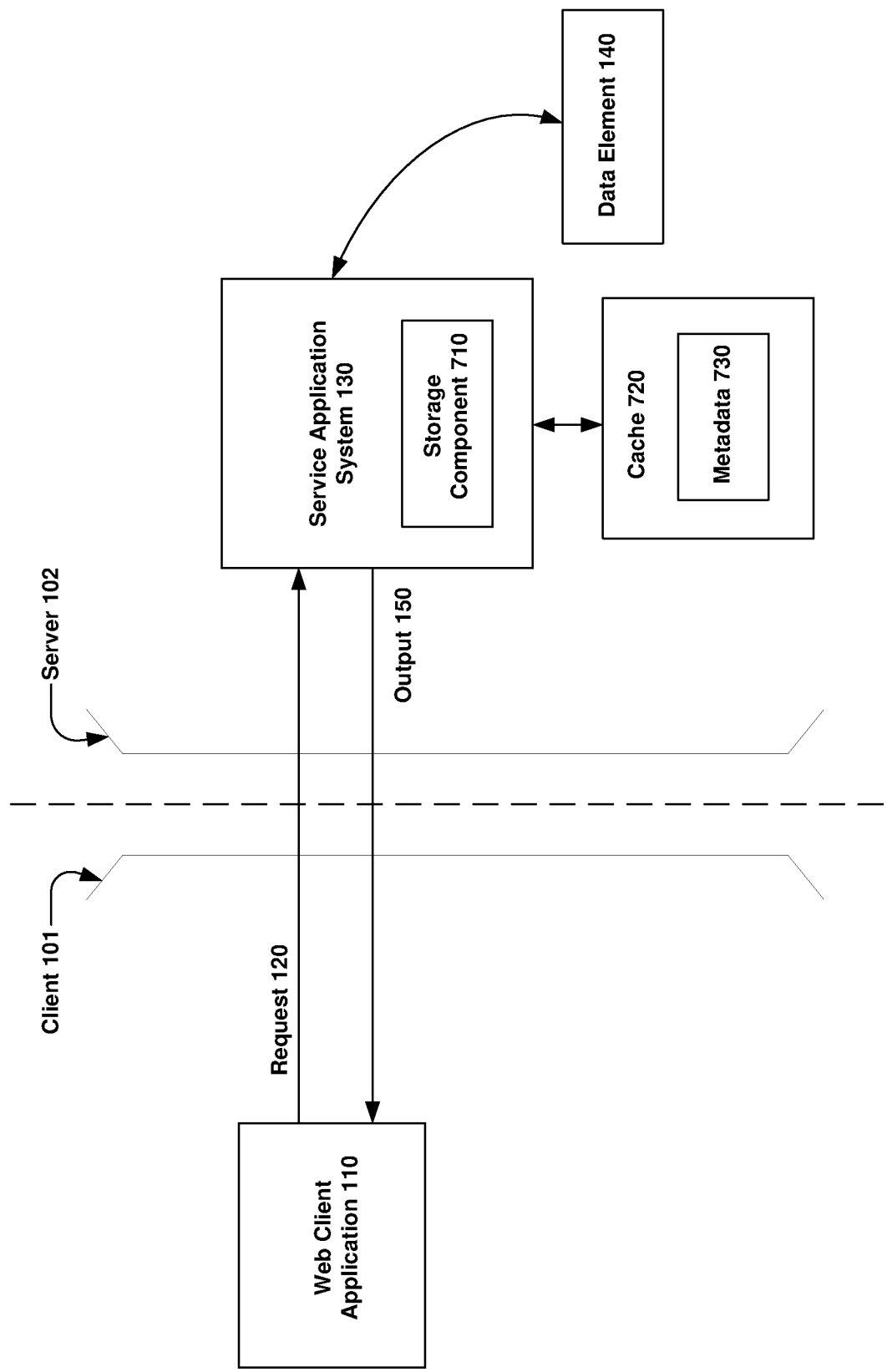
FIG. 7 illustrates an exemplary data services environment including a cache according to an embodiment.

Referring now to FIG. 7, service application system 130 can include storage component 710 that can store metadata 730 that is associated with the operation and/or the resource in cache 720 to obtain cached data. As such, invocation component 134 of service application system 130 can perform the action and/or the function, via the HTTP request, by referencing the cached data. In another embodiment, storage component 710 can further be configured to modify the cached data based on a URL included in request 120, e.g., based on the function segment and/or the action segment.

In another embodiment, interface component 132 can be configured to generate, send, etc. output 150, e.g., to web client application 110. In an aspect, output 150 can indicate a result of the operation, a return value of the operation, a status of the operation, etc. For example, in response to the function and/or the action not being invoked, executed, performed, etc. interface component 132 can output a message, e.g., via output 150, indicating, describing, etc. information about the operation, e.g., sample URL segment(s) that can be used to invoke the operation; the state of the resource, instance of the resource, data element 140, etc. In another example, in response to the respective operation not being invoked via invocation component 134, interface component 132 can output a message, e.g., via output 150, indicating the state of the resource, e.g., indicating a movie is checked out, the movie was successfully checked out, the movie is expected to be returned for checkout within a short period of time, etc.

Functions/Actions Via Open Data Protocol

Open Data Protocol (OData) enables the creation of REST-based data services, which allow resources using Uniform Resource Identifiers (URIs) and defined in an abstract data model, to be published and edited by WWW, or Web, clients using HTTP messages. OData is based on conventions defined in Atom Publishing Protocol (ATOM) and applies Web technologies such as HTTP and JavaScript Object Notation (JSON) to create a protocol that enables access to information from a variety of applications, services, and stores, e.g., relational databases, file systems, content management systems, Web sites, etc.

As such, OData includes feeds, which are collections of typed entries. Each typed entry represents a structured record with a key that has a list of properties. Further, entries can be part of a type hierarchy and can have related entries and related feeds via links. For example, the following URI represents a feed of product entries: http colon slash slash services dot odata dot org slash OData slash OData dot svc slash Products. Simple OData services can include a feed. More sophisticated OData services can have several feeds. Thus, a client can discover such feeds and addresses associated with such feeds by referencing a service document. For example, the following URI identifies a service document for a sample OData service: http colon slash slash services dot odata dot org slash OData slash OData dot svc. Further, OData services can expose service operations that are service-specific functions that accept input parameters and return entries or complex/primitive values.

OData services expose feeds, entries, properties within entries, links, service documents, and metadata documents via URIs in one or more formats, which can be acted on by clients using basic HTTP requests. To enable clients to discover the shape of an OData service, the structure of resources of the OData service, links between the resources, and service operations associated with the resources, an OData service can expose a service metadata document. The service metadata document can describe the data model, or Entity Data Model (EDM), e.g., describing structure and organization of resources associated with the data model, exposed as HTTP endpoints by the OData service.

As described above, RESTful web applications, e.g., associated with OData, use built-in HTTP verbs for performing CRUD operations on resources. However, other type(s) of operations, e.g., custom operations appropriate for a given data service, are not effectively represented and/or invoked via such RESTful web applications.

Figure 8:
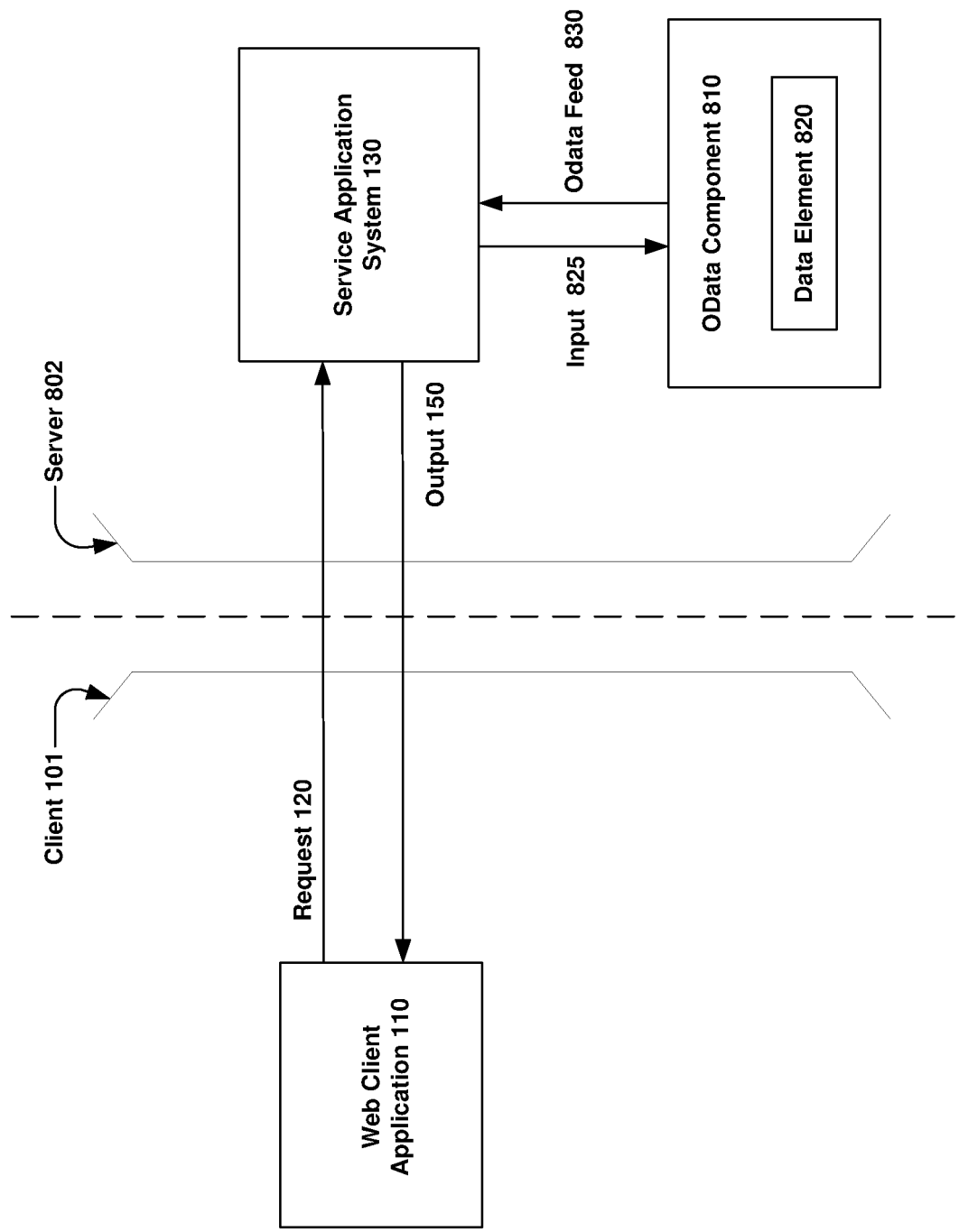
FIG. 8 illustrates an exemplary data services environment including an OData component according to an embodiment.

On the other hand, and now referring to FIG. 8, server 802 is depicted, including OData component 810, for performing an operation, e.g., a function, an action, etc. on a resource, an instance of the resource, a data entity, e.g., data element 820, etc. according to a state of the resource, the instance of the resource, the data entity, etc. by invoking an HTTP method on a URL indicating the operation. Further, OData component 810 can be configured to expose feeds, e.g., OData feed 830, entries, properties within entries, links, service documents, and/or metadata documents associated with data element 820 based on input 825 received from service application 130. For example, server 802 can enable client 101 to discover the shape, details, etc. of an action and/or a function associated with data element 820 via OData feed 830. For example, server 802 can expose a service metadata document for describing the first portion, the function segment, the action segment, the second portion, the resource, etc. in order, e.g., for client 101 to determine how to request a most recent order via an EDM. As such, Table I below describes, via the EDM, an example function for returning the most recent order.

TABLE I

```
<FunctionImport Name="MostRecent"
    IsBindable="true"
    IsSideEffecting="false"
    IsComposable="true"
    ReturnType="Northwind.Order"
    m:IsAlwaysBindable="true"
    EntitySet="Orders" >
    <Parameter Name="Orders" Type="Collection(Northwind.Order)"
    Mode="In"/>
</FunctionImport>
```

Table I illustrates a function named MostRecent that does not have side effects, that is composable, and can be bound to URIs returning a collection of orders. As such, Table II below illustrates acceptable/default parameters included in the EDM, e.g., associated with OData feed 830, for describing function(s) and/or action(s) for performing an operation on a resource, based on a state of the resource, by invoking an HTTP request on a URL indicating the operation.

TABLE II

| Facet | Acceptable Values | Default |
|---|---|---|
| SideEffecting | True/False | True |
| | | False = Function |
| | | True = Action |
| Composable | True/False | False |
| | | True is invalid if SideEffecting = true |
| Bindable | True/False | False |
| | True means that the first parameter can be used as a BindingParameter, i.e. when you have an OData url that terminates with a Type of the first parameter, you can bind the Function/Action to that url. | |
| EntitySet | Missing, EntitySet OR EntitySetPathExpression | Empty |
| | | NOTE EntitySet/ EntitySetPathExpression are mutual exclusive. They can only be set when the ReturnType is either an Entity or Collection(Entity). |
| | For example EntitySet= '{Binding}' to indicate that the output belongs to the same set as the entity(ies) to which this function is bound OR something like this: EntitySet= '{Binding}/Orders' where 'Orders' is a navigation property on the 'type' or 'element type' (in the case of collections) or the BindingParameter. | |

Referring to Tables I and II above, the presence of a binding parameter, e.g., "Bindable=true", enables a function to operate like an extension method against the parameter. As such, the MostRecent function can be appended to any URL segment or expression that terminates in a collection of orders.

Table III below illustrates representing an action and a function based on ATOM format. The action and the function can be exposed as a respective peer of an entity's links in ATOM, e.g., as an action element or a function element in the m namespace.

TABLE III

```
<m:action rel="{action-rel}"
    title="{action-title}"
    metadata="{action-metadata}"
    target="{action-target}" />
<m:function rel="{function-rel}"
    title="{function-title}"
    metadata="{function-metadata}"
    target="{function-target}" />
```

Table IV below illustrates representing an action and a function via Windows Communication Foundation (WCF) data services based on ATOM format.

TABLE IV

```
<m:action metadata="#Namespace.Promote"
    title="Promote Employee"
    target="Employee(6)/Promote" />
<m:action metadata#Namespace.AllReports"
    title="Get Employee's Reports"
    target="Employee(6)/AllReports" />
```

Table V below illustrates representing an action and a function based on JSON format.

TABLE V

```
"__metadata": {
    "uri": "entry-url",
    "type": "entry-type",
    "actions": {
        "{action-rel}": {
            "title": "{action-title}",
            "target": "{action-target}",
            "metadata": "{action-metadata}"
        }
    },
    "functions": {
        "{function-rel}": {
            "title": "{function-title}",
            "target": "{function-target}",
            "metadata": "{function-metadata}"
        }
    }
}
```

Table VI below illustrates representing an action and a function via Windows Communication Foundation (WCF) data services based on JSON format.

TABLE VI

```
"__metadata": {
    "uri": "entry-url",
    "type": "entry-type",
    "actions": {
        " #Namespace.Promote": {
            "title": "Promote Employee",
            "target": "http://server/service/Employee(6)/Promote",
        }
    },
    "functions": {
        " #Namespace.AllReports": {
            "title": "Get Employee's Reports",
            "target": "http://server/service/Employee(6)/AllReports"
        }
    }
}
```

Table VII below illustrates encoding parameters associated with an action, e.g., when such parameters are included, specified, etc. in the body of an action segment associated with the action request, by creating a wrapping object, e.g., a row type, including properties that are the names of the parameters of the action.

TABLE VII

```
{
    "parameter1": 45,
    "parameter2": "45.5"
}
```

Figure 9:
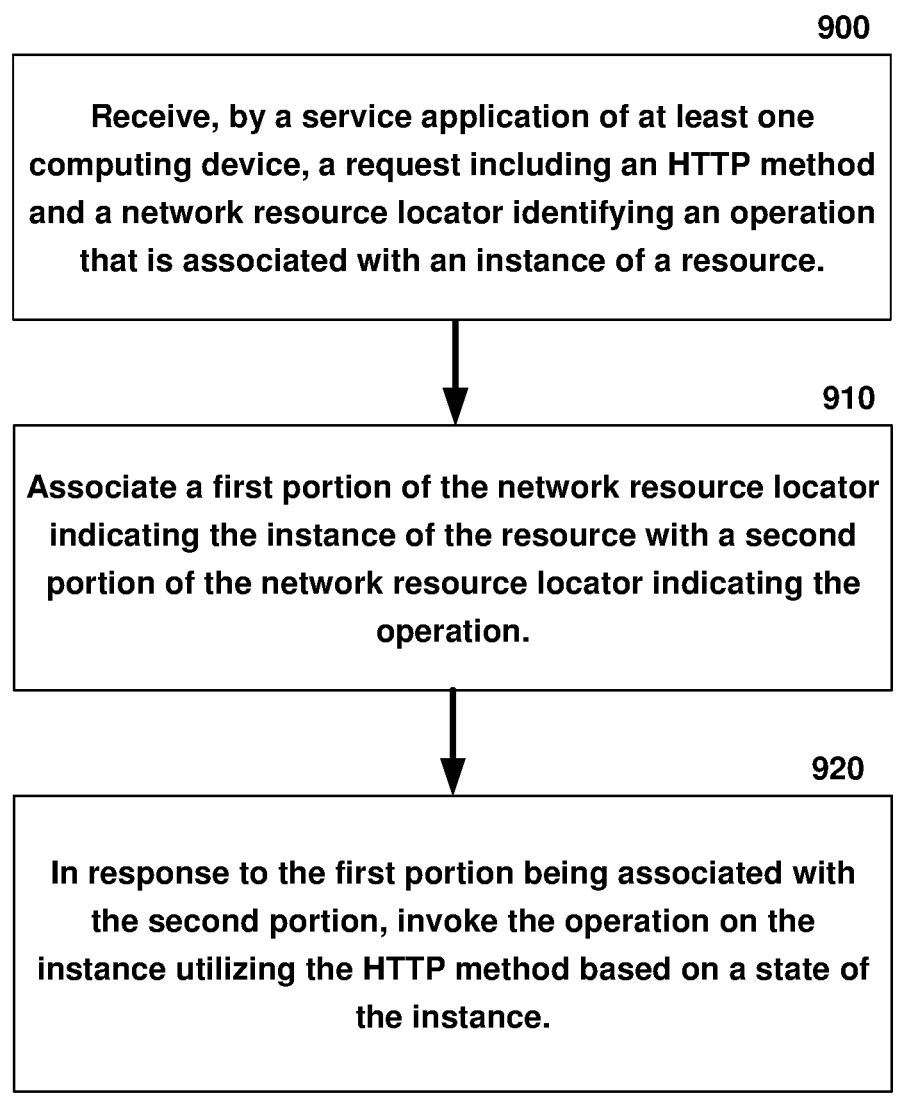
FIGS. 9-10 illustrate exemplary processes according to various embodiments.

FIG. 9 is a flow diagram illustrating an exemplary non-limiting embodiment for performing an operation on a resource, based on a state of the resource, by invoking an HTTP request on a URL indicating the operation. At 900, a request including an HTTP method and a network resource locator identifying an operation that is associated with an instance of a resource is received by a service application of at least one computing device. At 910, a first portion of the network resource locator indicating the instance of the resource can be associated with a second portion of the network resource locator indicating the operation. At 920, in response to the first portion being associated with the second portion, the operation can be invoked on the instance utilizing the HTTP method based on a state of the instance.

In an embodiment, the operation can be defined using one or more entity data model types, e.g., utilizing a Function-Import element in CSDL. In another embodiment, metadata that is associated with the first portion, the second portion, and/or the instance can be stored in a cache as cached data for re-use.

Figure 10:
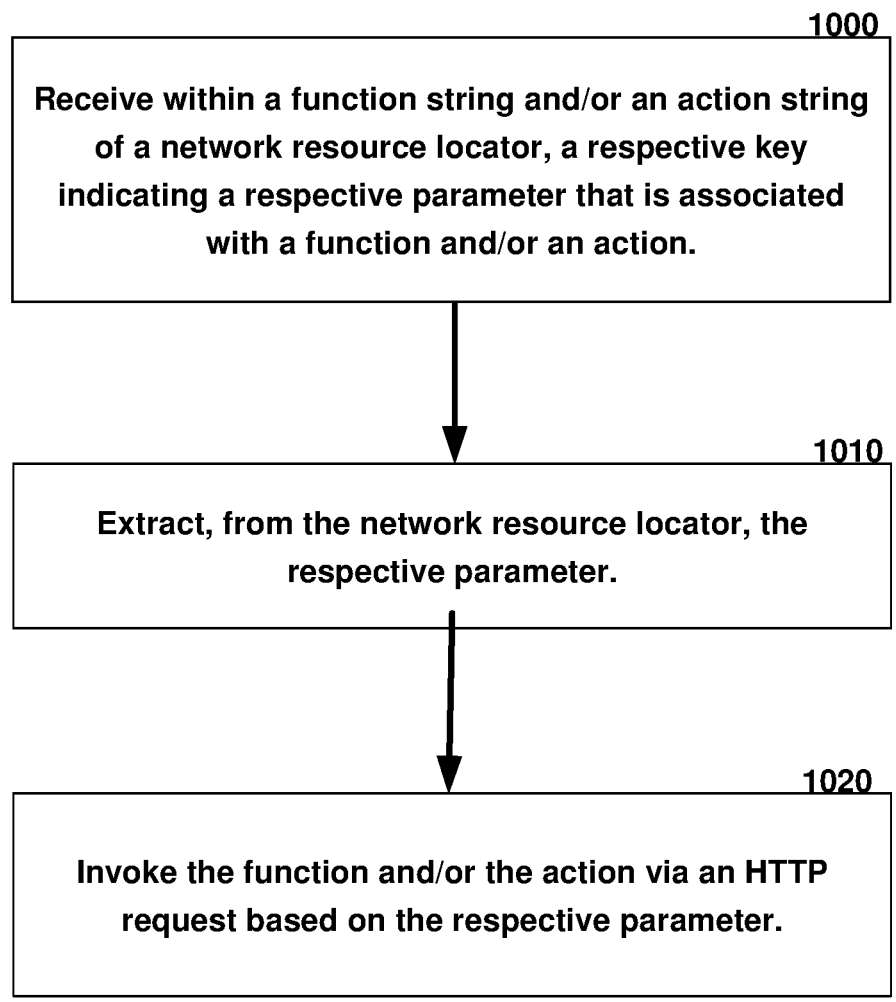

FIG. 10 is flow diagram illustrating another exemplary non-limiting embodiment for performing an operation on a resource, based on a state of the resource, by invoking an HTTP request on a URL indicating the operation. At 1000, a respective key indicating a respective parameter that is associated with a function and/or an action can be received within a function string and/or an action string of a network resource locator. At 1010, the respective parameter can be extracted from the network resource locator. At 1020, the function and/or the action can be invoked, via the HTTP request and based on the respective parameter, e.g., based on code described above in Table XV.

Exemplary Networked and Distributed Environments

One of ordinary skill in the art can appreciate that the various embodiments described herein for performing an operation on a resource, based on a state of the resource, by invoking an HTTP request on a URL indicating the operation can be implemented in connection with any computer or other client, e.g., client 101, etc. or server, e.g., server 102, server 802, etc. device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms for performing an operation on a resource, based on a state of the resource, by invoking an HTTP request on a URL indicating the operation described for various embodiments of the subject disclosure.

Figure 11:
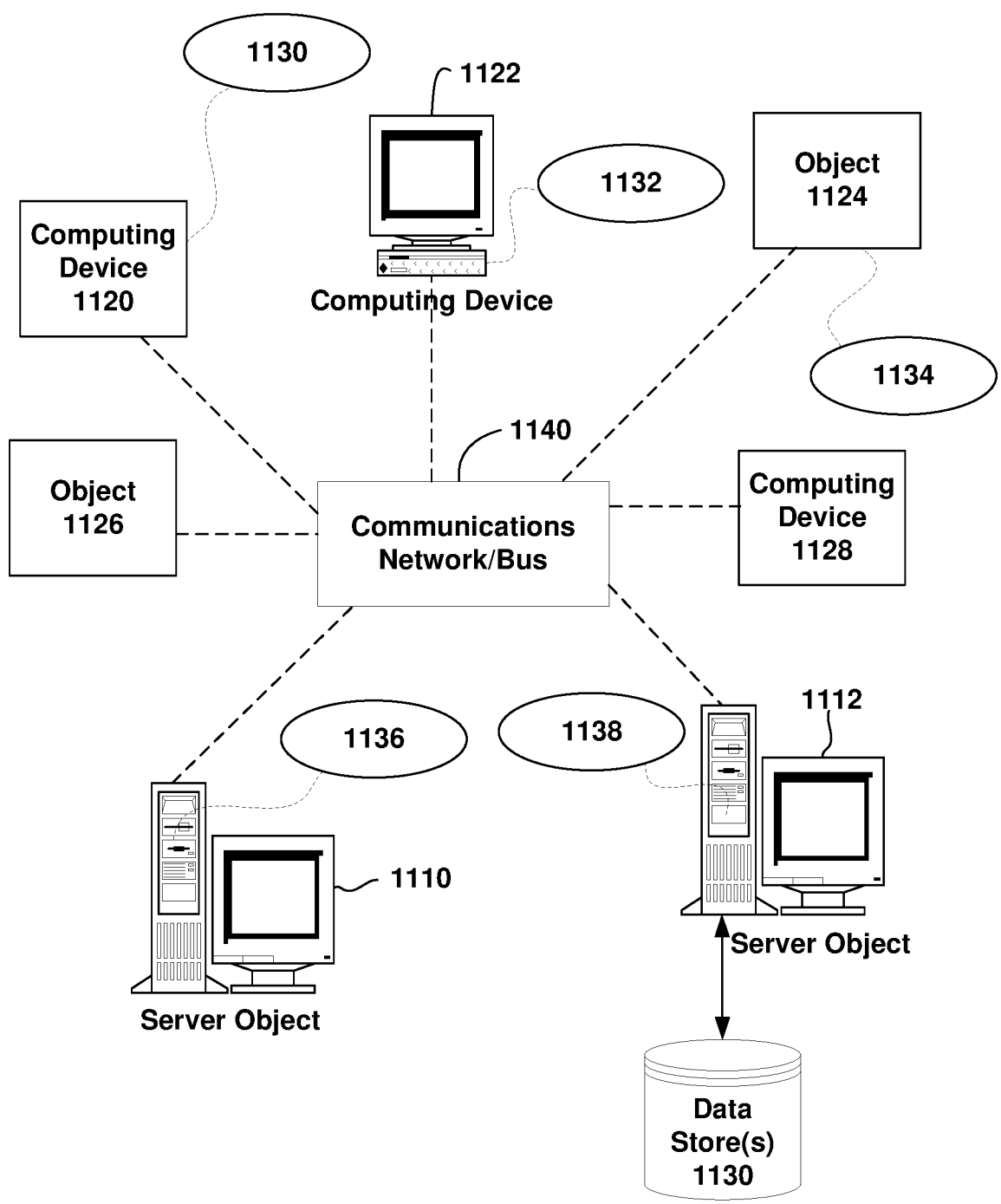
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be noted that computing objects 1110, 1112, etc. and computing objects or devices 1120, 1122, 1124, 1126, 1128, etc. may comprise different devices, such as PDAs, audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques for performing an operation on a resource, based on a state of the resource, by invoking an HTTP request on a URL indicating the operation, provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems performing an operation on a resource, based on a state of the resource, by invoking an HTTP request on a URL indicating the operation as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client, e.g., client 101, is usually a computer that accesses shared network resources provided by another computer, e.g., a server, e.g., server 102, sever 808. In the illustration of FIG. 11, as a non-limiting example, computing objects or devices 1120, 1122, 1124, 1126, 1128, etc. can be thought of as clients and computing objects 1110, 1112, etc. can be thought of as servers in which computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances. Any of these computing devices may be processing data, or requesting transaction services or tasks that may implicate the techniques for performing an operation on a resource, based on a state of the resource, by invoking an HTTP request on a URL indicating the operation as described herein for one or more embodiments.

A server, e.g., server 102, server 802, etc. is typically a remote computer system accessible over a remote or local network, such as the Internet or wireless network infrastructures. The client process may be active in a first computer system, and the server process may be active in a second computer system, e.g., related to embodiments associated with FIGS. 1-10 disclosed herein, communicating with one another over a communications medium, thus providing distributed functionality and allowing multiple clients to take advantage of the information-gathering capabilities of the server. Any software objects utilized pursuant to the techniques for performing an operation on a resource, based on a state of the resource, by invoking an HTTP request on a URL indicating the operation can be provided standalone, or distributed, across multiple computing devices or objects.

In a network environment in which the communications network/bus 1140 is the Internet, for example, e.g., related to embodiments associated with FIGS. 1-10 disclosed herein, the computing objects 1110, 1112, etc. can be Web servers with which the client computing objects or devices 1120, 1122, 1124, 1126, 1128, etc. communicate via any of a number of known protocols, such as HTTP. Servers 1110, 1112, etc. may also serve as client computing objects or devices 1120, 1122, 1124, 1126, 1128, etc., as may be characteristic of a distributed computing environment.

Exemplary Computing Device

Figure 12:
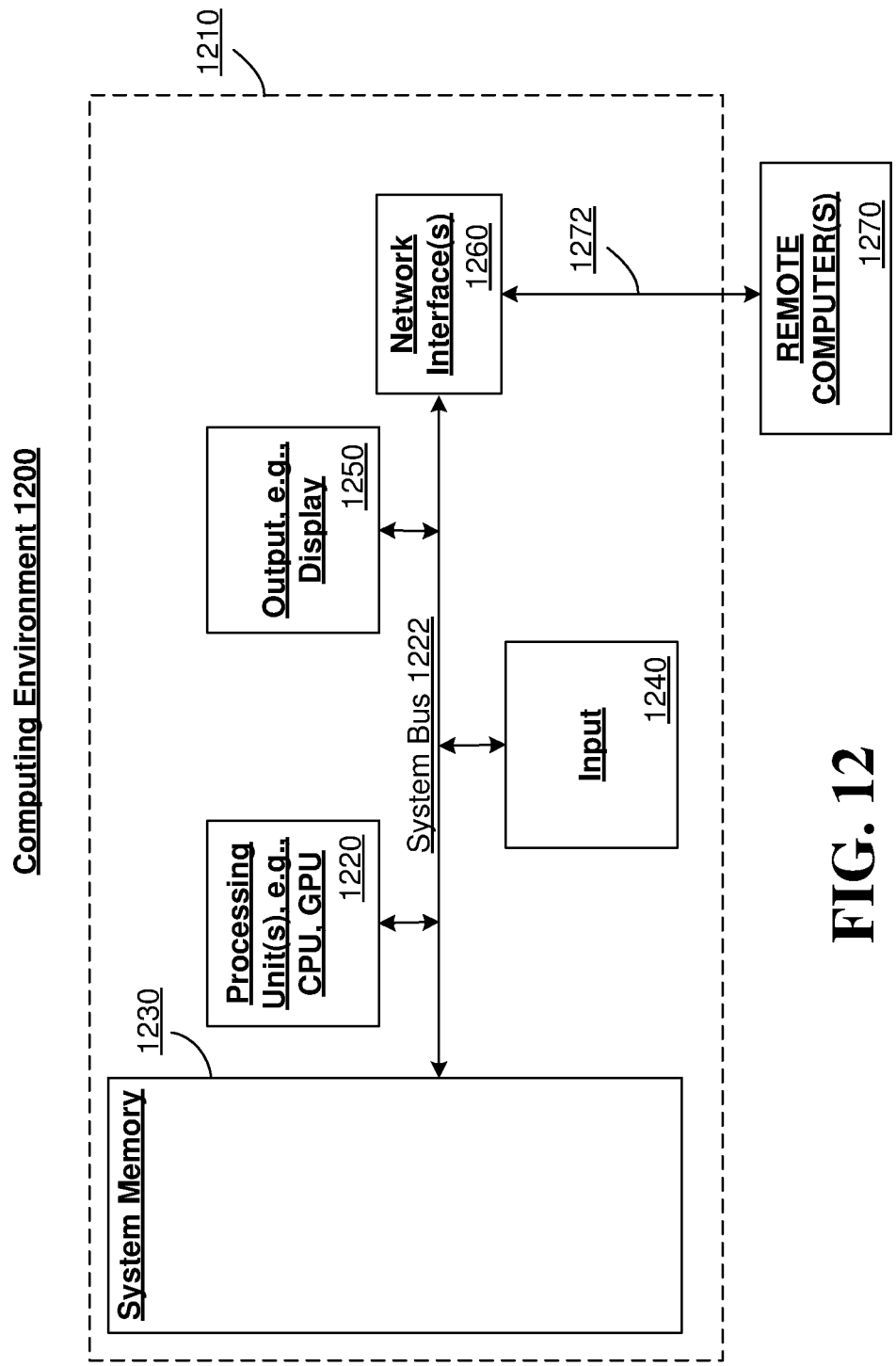
FIG. 12 is a block diagram representing an exemplary non-limiting computing system or operating environment in which one or more aspects of various embodiments described herein can be implemented.

As mentioned, advantageously, the techniques described herein can be applied to any device where it is desirable to include an action/function reference within a network resource locator. It is to be understood, therefore, that handheld, portable and other computing devices and computing objects of all kinds are contemplated for use in connection with the various embodiments, i.e., anywhere that a device may wish to access information via a REST-based data service enabling a server to for performing an operation on a resource, based on a state of the resource, by invoking an HTTP request on a URL indicating the operation. Accordingly, the below general purpose computer described below in FIG. 12 is but one example of a computing device. Additionally, a server, or a database server, e.g., associated with the service application described above, can include one or more aspects of the below general purpose computer.

Although not required, embodiments can partly be implemented via an operating system, for use by a developer of services for a device or object, and/or included within application software, e.g., the service application described above, that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing environment 1200 interpreted as having any dependency or requirement relating to any one or combination of components illustrated in the exemplary operating environment 1200.

With reference to FIG. 12, an exemplary remote device for implementing one or more embodiments includes a general purpose computer, or computing device, in the form of computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

Computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques for performing an operation on a resource, based on a state of the resource, by invoking an HTTP request on a URL indicating the operation as described herein. Thus, embodiments herein are contemplated from the standpoint of an API (or other software object), as well as from a software or hardware object that implements one or more aspects of such techniques. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be noted that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better noted with reference to the flowcharts of the various figures. While for purposes of simplicity of explanation, the methodologies are shown and described as a series of blocks, it is to be understood and noted that the claimed subject matter is not limited by the order of the blocks, as some blocks may occur in different orders and/or concurrently with other blocks from what is depicted and described herein. Where non-sequential, or branched, flow is illustrated via flowchart, it can be noted that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. Accordingly, the invention is not to be limited to any single embodiment, but rather can be construed in breadth, spirit and scope in accordance with the appended claims.

What is claimed is:

1. A system comprising:
   at least one processor coupled to a memory;
   wherein the memory includes instructions that when executed by the at least one processor performs actions that:
   receive a request to perform a custom operation on an instance of a resource of a Representational State Transfer (REST)-based data service, the resource associated with a collection of indexed entries, the request including two separate segments, a first segment including an HyperText Transfer Protocol (HTTP) method and a second segment including a network resource locator, the network resource locator including a first portion and a second portion, the first portion representing the instance of the resource by identifying a collection and an index within the specified collection, the second portion identifies the custom operation; and
   invoke the custom operation on the resource utilizing the HTTP method based on a state of the resource.

2. The system of claim 1, wherein the second portion includes a function string identifying a function to be performed on the instance of the resource utilizing the HTTP method.

3. The system of claim 1, wherein the second portion includes an action string identifying an action to be performed on the instance of the resource utilizing the HTTP method.

4. The system of claim 2, wherein the first portion of the network resource locator is included in the function string.

5. The system of claim 3, wherein the first portion of the network resource locator is included in the action string.

6. The system of claim 1, wherein the second portion includes an action string appended to a function string, the action string identifying an action to be performed on the instance of the resource utilizing the HTTP method, the function string identifying a function to be performed on the instance of the resource utilizing the HTTP method.

7. The system of claim 1, wherein the memory includes further instructions that when executed by the at least one processor performs actions that:
   publish the network resource locator as an opaque link within a return payload of one or more requested resources.

8. The system of claim 7, wherein the memory includes further instructions that when executed by the at least one processor performs actions that:
   conditionally publish the opaque link and metadata associated with the opaque link for entries within a feed based on a state of the resource.

9. The system of claim 7, wherein the memory includes further instructions that when executed by the at least one processor performs actions that:
   define the custom operation using one or more entity data model types.

10. A method comprising:
    receiving, at a Representational State Transfer (REST)-based data service having at least one computing device, the at least one computing device including a processor and a memory, a request including two separate segments, a first segment including an HyperText Transfer Protocol (HTTP) method and a second segment including a network resource locator, the network resource locator identifying an action that is associated with an instance of a resource, the network resource locator including a first portion and a second portion, the first portion representing the instance of the resource, the second portion identifies a custom operation to be performed on the instance of the resource of the REST-based data service;
    associating the first portion of the network resource locator with the second portion of the network resource locator; and
    invoking the action on the instance of the resource utilizing the HTTP method based on a state of the instance.

11. The method of claim 10, wherein the receiving further includes receiving a key indicating a parameter that is associated with the action.

12. The method of claim 10, wherein the receiving further includes receiving at least one parameter string being appended to an action string and including a parameter that is associated with the action.

13. The method of claim 10, wherein the receiving further includes receiving a function string being appended to at least one other function string and receiving an action string being appended to the function string.

14. The method of claim 10, further comprising:
    caching metadata that is associated with at least one of the first portion, the second portion, or the instance for re-use.

* * * * *